(12) United States Patent
Sutton et al.

(10) Patent No.: US 8,721,037 B2
(45) Date of Patent: May 13, 2014

(54) COMPOSITE INK ABSORBER (75) Inventors: Donald Sutton, Camas, WA (US); Lynn Cheney, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

(21) Appl. No.: 13/095,723

(22) Filed: Apr. 27, 2011

(65) Prior Publication Data

US 2012/0242744 A1 Sep. 27, 2012

Related U.S. Application Data (63) Continuation-in-part of application No. 13/053,985, filed on Mar. 22, 2011, now Pat. No. 8,469,486.

(51) Int. Cl.
*B41J 2/165* (2006.01)

(52) U.S. Cl.
USPC .......................................................... 347/31

(58) Field of Classification Search
USPC ......................................... 347/22–23, 31, 36
See application file for complete search history.

(56) References Cited

U.S. PATENT DOCUMENTS

| 6,699,423 B2 | 3/2004 | Katsumata et al. |
| 6,809,047 B2 | 10/2004 | Lebold et al. |
| 7,497,564 B2 | 3/2009 | Yui |

FOREIGN PATENT DOCUMENTS

| JP | 2002029066 | 1/2002 |
| JP | 2002225311 | 8/2002 |
| JP | 2006062309 | 3/2006 |
| JP | 2010099890 | 5/2010 |

*Primary Examiner* — Lamson Nguyen
(74) *Attorney, Agent, or Firm* — Steven R. Ormiston (57) ABSTRACT In one embodiment, a composite ink absorber includes a porous layer and an absorbent layer integrated together into a single part. The porous layer is configured to trap inky sludge while simultaneously allowing ink liquids to pass through to the absorbent layer and the absorbent layer is configured to absorb ink liquids passing through the porous layer. In one embodiment, a printer platen assembly includes a platen and a composite, single part ink absorber covering the floor of the platen for capturing ink overspray in the platen area.

19 Claims, 7 Drawing Sheets

COMPOSITE INK ABSORBER

CROSS REFERENCE TO RELATED APPLICATIONS

This is a continuation-in-part of U.S. patent application Ser. No. 13/053,985 filed Mar. 22, 2011 now U.S. Pat. No. 8,469,486 titled Image Forming Apparatus And Media Support Device Thereof.

BACKGROUND

In many inkjet printers, the paper or other print substrate is supported on a platen as the substrate moves through the print zone. For borderless printing, in which there is no unprinted margin at the edge of the substrate, ink absorbers are used in and around the platen to contain the substantial ink overspray. The use of pigment based inks presents unique challenges for containing ink overspray compared to dye based inks. Pigment based inks create more inky sludge than dye based inks, particularly when used with color locking papers. Color locking paper contains chemicals to solidify ink, particularly pigment ink. The color locking chemicals may be shed in the printer as a component of paper dust. Paper dust containing color locking chemical reacts with ink to produce an inky sludge containing solid and/or semi-solid particles. The consistency of the sludge is highly variable depending on factors including the type of paper and the amount of ink overspray, and ranges from liquid ink to solid. Conventional ink absorbers do not effectively contain both the inky sludge and the liquid ink overspray associated with the use of pigment based inks.

DRAWINGS

The same part numbers are used to designate the same or similar parts throughout the figures.

DESCRIPTION

A new composite ink absorber and a new platen assembly have been developed to help effectively contain both the inky sludge and the liquid ink overspray associated with the use of pigment based inks for borderless printing. In one example embodiment of the new ink absorber, a porous layer and an absorbent wicking layer are laminated together to form a single composite part. The porous layer, an open cell foam for example, is configured to trap inky sludge while simultaneously allowing ink liquids to pass through to the absorbent layer. The absorbent layer, a needle felt for example, is configured to absorb and disperse ink liquids that pass through the porous layer to the absorbent layer. The new, integrated composite absorber captures sludge below the surface of the absorber to reduce the growth of sludge piles on the surface of the absorber while still allowing the ink liquids to move effectively into the adsorbent layer.

In one example embodiment of the new platen assembly, a laminated ink absorber such as the one described above covers the floor of the platen in the substrate support area to capture ink overspray. The ink absorber may be used in combination with a pair of cavities formed in the platen floor laterally on either side of the substrate support area to capture ink overspray in those areas where the overspray is likely to be heaviest during borderless printing.

As used in this document, "laminate" means uniting two or more layers of material by an adhesive or other means; and "platen" means a structure for supporting a print substrate, and is not limited to a flat plate or a planar structure but may include, for example, protruding ribs.

Figure 1:
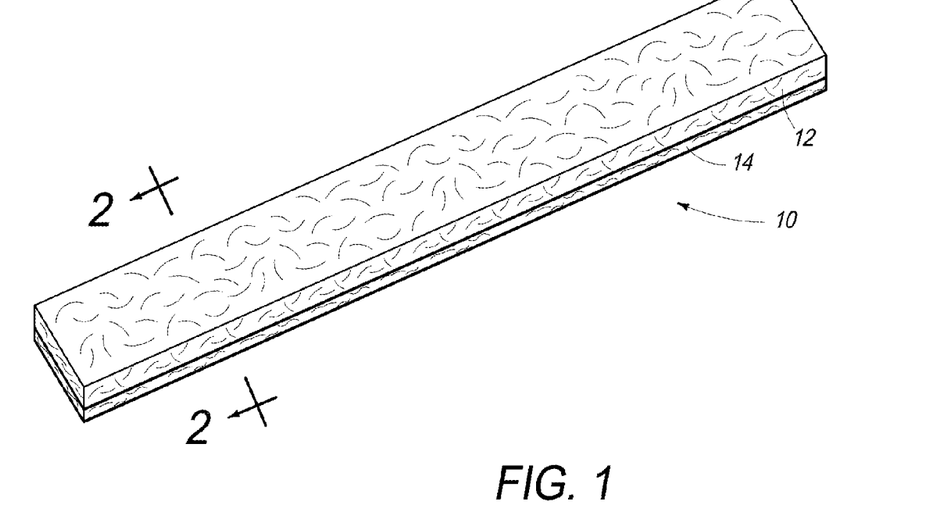
FIG. 1 is an isometric view illustrating one example embodiment of a new composite ink absorber.
Figure 2:
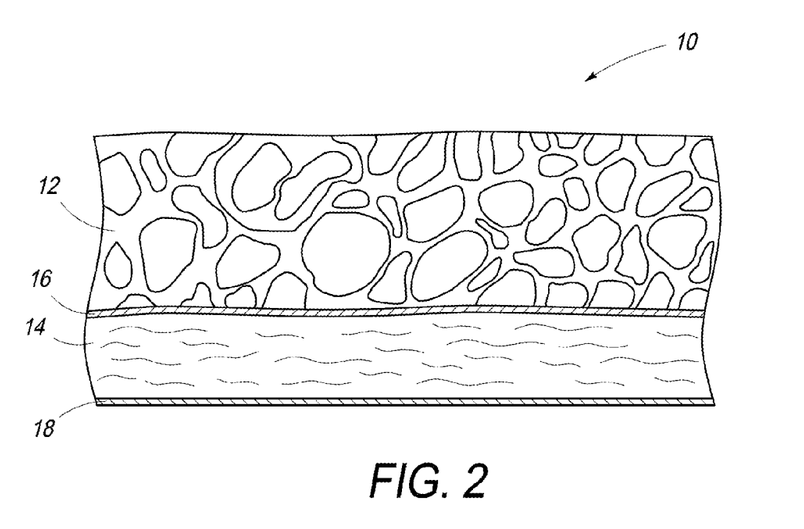
FIG. 2 is a partial section view detail taken along the line 2-2 in FIG. 1.

FIG. 1 is an isometric view illustrating one example embodiment of a new composite ink absorber 10. FIG. 2 is a partial section view detail of ink absorber 10 taken along the line 2-2 in FIG. 1. Referring to FIGS. 1 and 2, a layer of porous material 12 and a layer of absorbent, wicking material 14 are laminated together to form a single composite part 10. Porous layer 12 is formed from open cell foam or another suitable material that may be effectively laminated to absorbent layer 14 and configured to trap inky sludge while simultaneously allowing ink liquids to pass through to absorbent layer 14. Absorbent layer 14 is formed from needle felt or another suitable material that may be effectively laminated to porous layer 12 and configured to absorb ink liquids passing through porous layer 12 to absorbent layer 14, for example by wicking liquid ink away the interface between the two layers and dispersing the liquid ink in absorbent layer 14.

An open cell foam, porous layer 12 and a needle felt, absorbent layer 14 may be effectively united, for example, using a hot-melt adhesive web or a spray-on adhesive. Although the laminating adhesive is indicated by a definite layer 16 in FIG. 2, these lamination processes result in an open interface 16 through which liquid ink may pass easily from foam 12 to felt 14. An adhesive layer 18 along the bottom of felt 14 may be used to hold absorber 10 in place in a printer platen assembly, for example as described below with reference to FIGS. 4 and 5.

Previous absorber designs used foam and felt layers stacked as discrete components. These designs suffered from a lack of effective ink liquid transfer from the foam layer to the felt layer due to inconsistent contact between the two layers, which resulted in inadequate capillary contact across the gap. In addition, the low structural integrity of open cell foam used as a discrete component limited the thickness, density, and cell size of the foam that could be used in conventional absorbers. The new absorber overcomes these problems by laminating the two layers together into a single part in a way that creates an effective interface between the two layers—an interface 16 that develops adequate capillary action between the two layers 12 and 14 without compromising the desired performance characteristics of each of the individual layers 12, 14. Joining the otherwise flimsy open cell foam to the comparatively stiff needle felt enables the use of thinner, less dense foam with larger cell size. Forming composite absorber 10 as a single, integrated part also simplifies assembly of the absorber into the printer platen and makes it easier to control the location of the upper, porous component.

Ink overspray readily enters the pockets of open cell foam 12 where it is trapped by impingement and coalescence. Ink liquids pass through foam 12 under a combination of capillary action and gravity and disperse in absorbent layer 14. Inky sludge (ink pigment and other solids and semi-solids) remains trapped in the foam pockets of layer 12. In one example, porous layer 12 is formed from a 2-3 mm thick layer of polyether urethane open cell foam having 20-40 pores per inch and absorbent layer 14 is formed from a 2-3 mm thick layer of medium density needle felt. The ideal skeletal structure for an open cell foam used for porous layer 12 is one in which all walls between the cells have blown—it is desirable to maximize reticulation with close to 100% of the cell walls blown, leaving a "fishnet" type cell interface structure.

One advantage of the new absorber is that inky sludge buildup begins below the surface of the absorber, within the cells of the porous layer, rather than on the surface. For the configuration of absorber 10 noted above, tests show that that the buildup of sludge begins in the cells approximately 2 mm below the surface of layer 12. Thus, the buildup of sludge above the top of the porous layer is delayed, extending the useful printer life. Liquids, however, pass through into the absorbent layer. This allows the absorber to function usefully in extending printer life both at the extreme of highly liquid ink and at the extreme of solidifying sludge.

Figure 3:
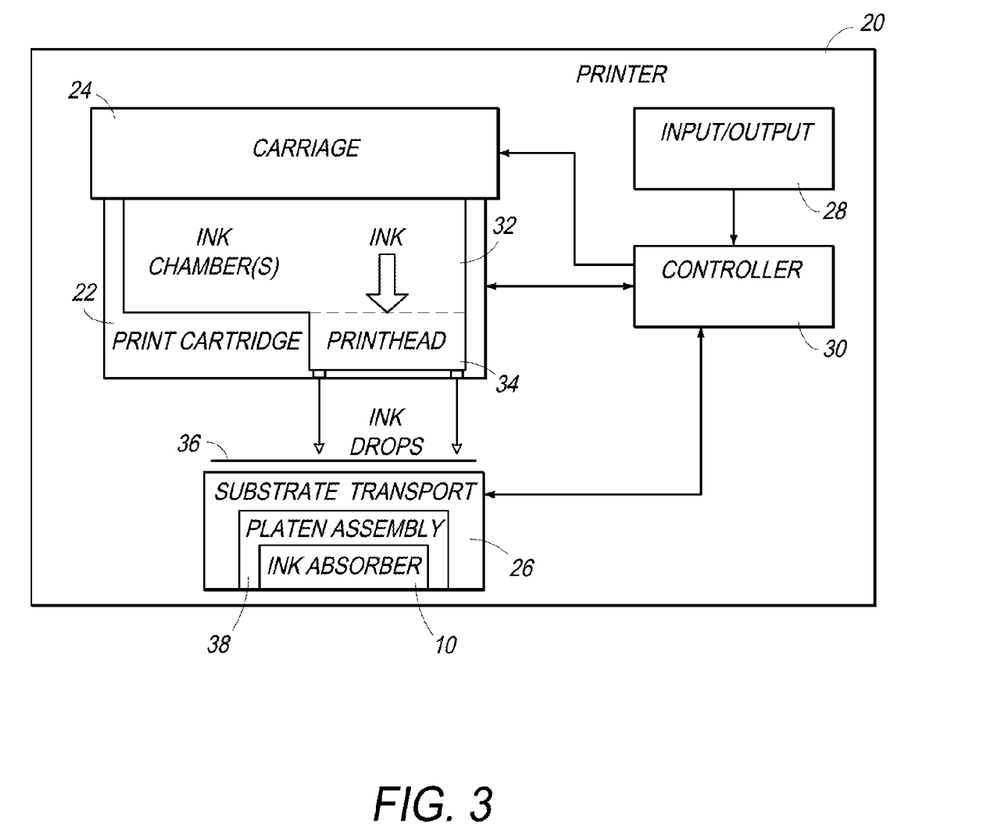
FIG. 3 is a block diagram illustrating one example of an inkjet printer in which embodiments of the new ink absorber and embodiments of the new platen assembly may be implemented.

FIG. 3 is a block diagram illustrating one example of an inkjet printer 20 in which embodiments of the new ink absorber and embodiments of the new platen assembly may be implemented. Referring to FIG. 3, printer 20 includes a print cartridge 22, a carriage 24, a print substrate transport mechanism 26, an input/output device 28, and an electronic printer controller 30 connected to each of the operative components of printer 20. Print cartridge 22 includes one or more ink holding chambers 32 and a printhead 34. Printhead 34 represents generally an electromechanical assembly that contains an arrangement of miniature thermal, piezoelectric or other devices that are energized or activated to eject small droplets of ink out of an associated array of openings. Print cartridge 22 may include, for example, a series of stationary cartridges and/or printheads that span the width of print media 36. Alternatively, cartridge 22 may include one or more cartridges that are scanned back and forth on carriage 24 across the width of print substrate 36. Other cartridge or printhead configurations are possible.

Controller 30 may communicate with external systems or networks through input/output device 28. Controller 30 controls the movement of carriage 24 and substrate transport 26. Controller 30 is electrically connected to printhead 34 to energize the firing elements to eject ink drops on to substrate 36. By coordinating the relative position of cartridge 22 and printhead 34 with substrate 36 and the ejection of ink drops, controller 30 produces the desired image on substrate 36, for example according to print data received through input/output device 28.

Substrate transport 26 in printer 10 includes a platen assembly 38 that supports print substrate 36 in a print zone 39 adjacent to printhead 34. Platen assembly 38 includes a composite ink absorber 10, such as ink absorber 10 shown in FIGS. 1 and 2.

Figure 4:
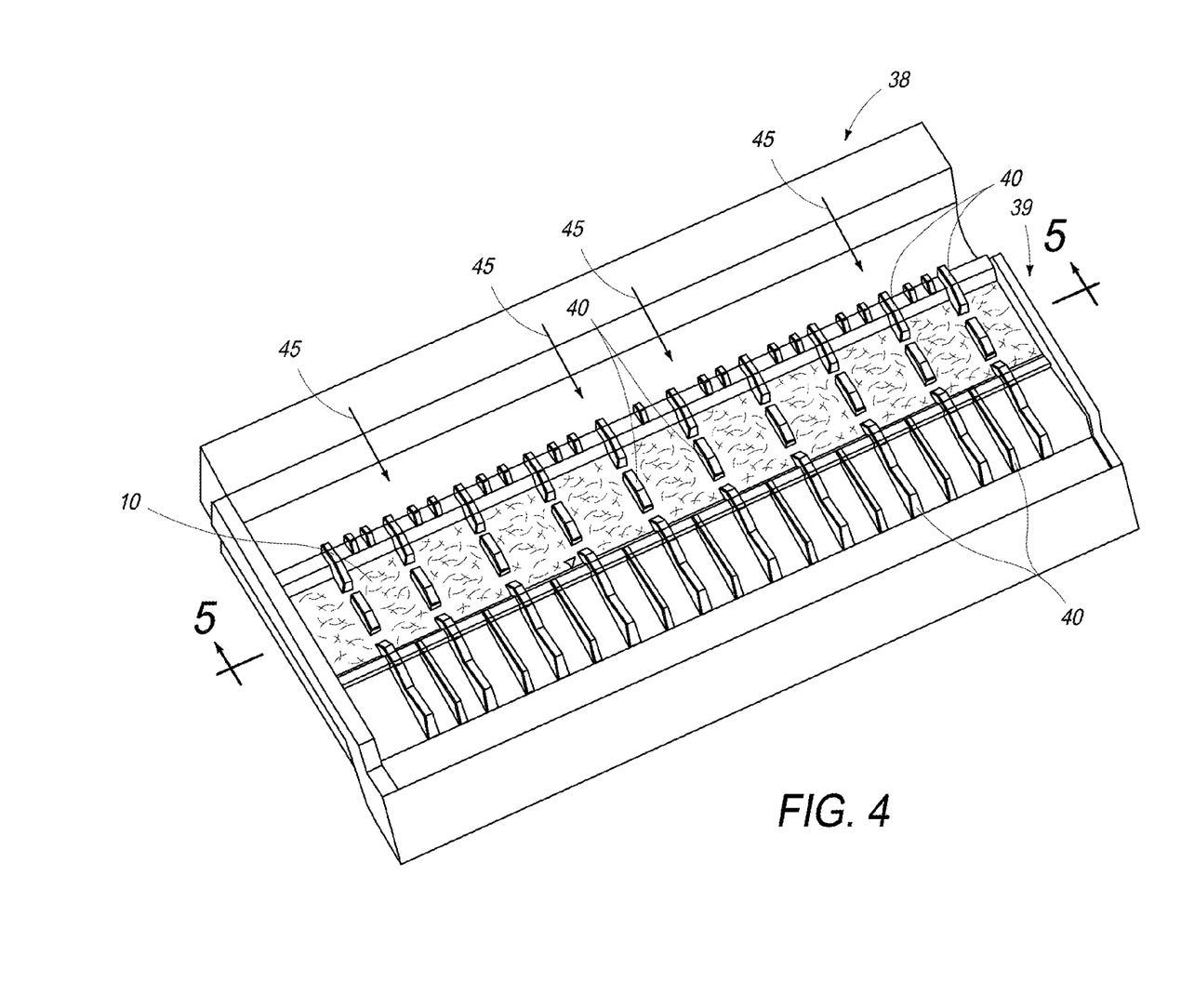
FIG. 4 is an isometric view illustrating one example embodiment of a new platen assembly using the ink absorber of in FIGS. 1 and 2.
Figure 5:
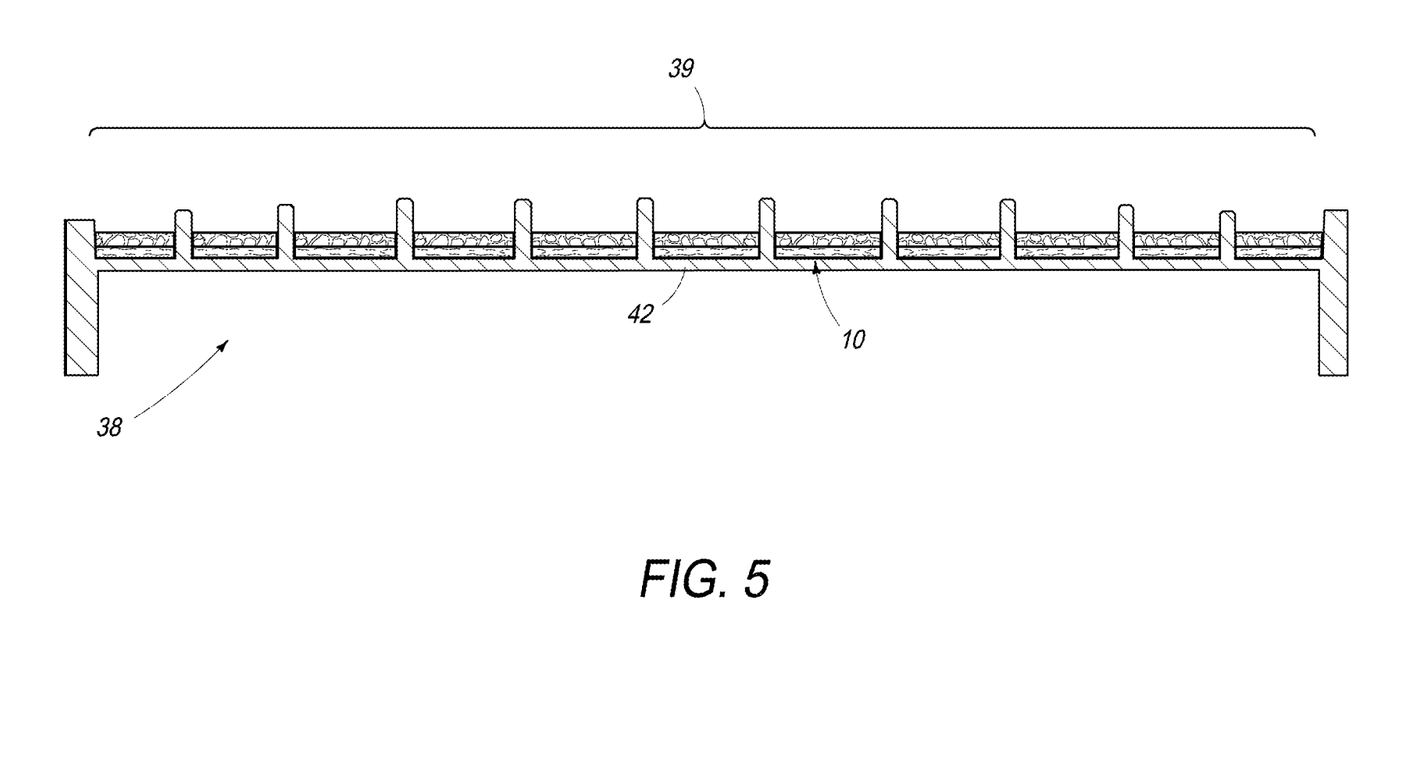
FIG. 5 is a section view taken along the line 5-5 in FIG. 4.

One example embodiment for a platen assembly 38 in printer 10 is shown in FIGS. 4 and 5. FIG. 4 is an isometric view of platen assembly 38. FIG. 5 is a section view of platen assembly 38 taken along the line 5-5 in FIG. 4. Referring to FIGS. 4 and 5, platen assembly 38 includes multiple ribs 40 protruding up from a floor 42 for supporting various sizes of print substrates in print zone 39. The direction the print substrates move across platen assembly 38 is indicated by arrows 45 in FIG. 4. For borderless printing, ink overspray will be directed onto absorber 10 around the perimeter of the print substrates as they pass through print zone 39. Accordingly, in the embodiment shown in FIGS. 4-5, absorber 10 covers the entire surface of platen assembly 38 subjected to overspray for any size print substrate, to trap ink overspray along the top edge, sides, and bottom edge of the print substrate.

Figure 6:
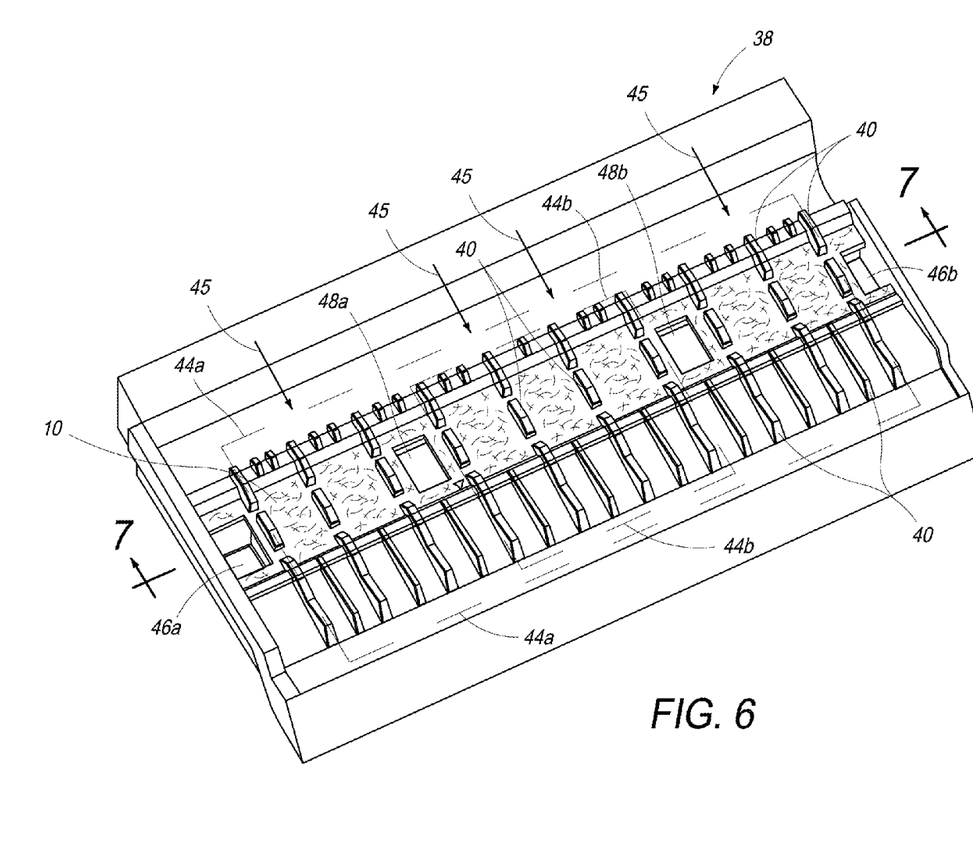
FIG. 6 is an isometric view illustrating another example embodiment of a new platen assembly using the ink absorber of in FIGS. 1 and 2.
Figure 7:
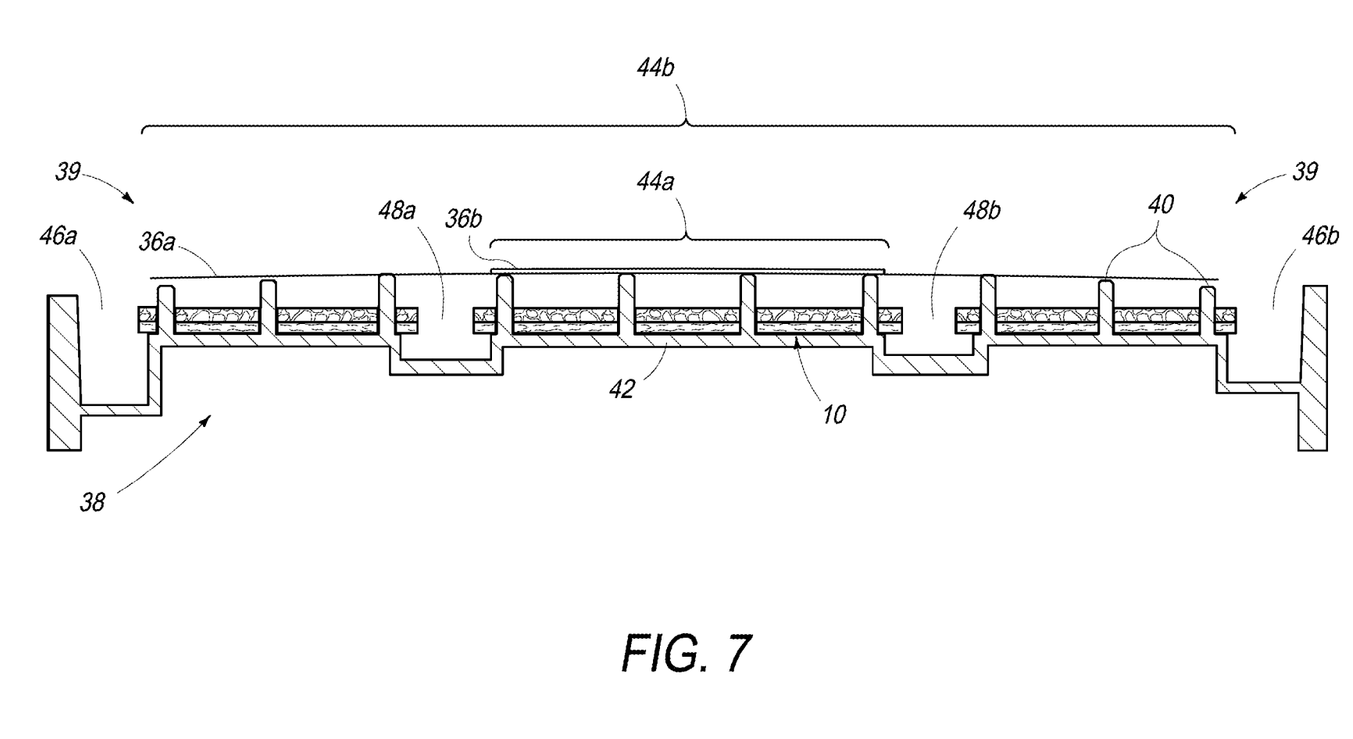
FIG. 7 is a section view taken along the line 7-7 in FIG. 6.

In another example implementation for a platen assembly 38, shown in FIGS. 6 and 7, platen assembly 38 also includes two sets of cavities 46a, 46b and 48a, 48b for capturing ink overspray along the sides of two different size substrate support areas 44a and 44b, respectively. For example, a first, smaller substrate support area 44a may correspond to four inch by six inch photo paper and a second, larger substrate support area 44b may correspond to A4 print substrates. Cavities 46a and 46b are located immediately adjacent to print zone 39 on either side of support area 44a for larger size print substrates 36a (FIG. 5), where ink overspray is expected to be highest (the top and bottom edges of the substrate typically will have less overspray). Similarly, cavities 48a and 48b are located immediately adjacent to print zone 39 on either side of support area 44b for smaller size print substrates 36b (FIG. 5). Each cavity 46a, 46b and 48a, 48b is positioned and sized and shaped to capture much of the lateral ink overspray for borderless printing and to store waste ink well below print substrates 36 so as not to smear the bottom of the print substrates or otherwise adversely affect print quality. This alternative embodiment can further extend the useful life of the printer by adding sludge trapping capacity beyond that of absorber 10 alone.

With continued reference to FIGS. 6-7, composite ink absorber 10 extends across print zone 39 within substrate support areas 44a, 44b. Absorber 10 surrounds cavities 48a, 48b and partially surrounds cavities 46a, 46b. Also, in the embodiment shown in FIGS. 6-7, absorber 10 protrudes over the edge of cavities 46a, 46b and 48a, 48b as best seen in FIG. 7. It may be desirable in some applications for platen assembly 38 that absorber 10 overlap the edges of the cavities to help mitigate splashing or spilling ink liquids and inky sludge from the cavities, for example when moving the printer. Ink absorber 10 may be permanently installed into platen assembly 38 with sufficient holding capacity for ink liquids and inky sludge to last the expected useful life of platen assembly 38. Alternatively, ink absorber 10 may be installed as a removable component that can be replaced periodically to extend the useful life of platen assembly 38, for example using a non-permanent mounting adhesive 18 (FIG. 2).

Figure 8:
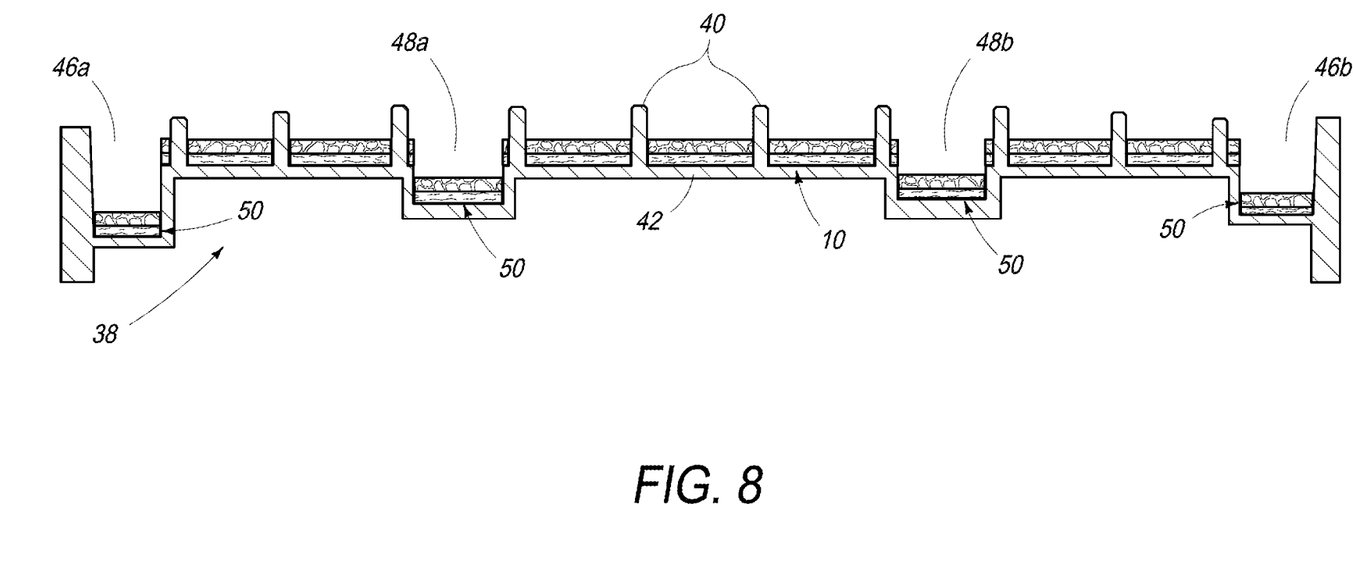
FIG. 8 is a section view showing an alternative implementation of a platen assembly such as that shown in FIGS. 6 and 7.

In an alternative implementation shown in FIG. 8, each cavity 46a, 46b, 48a, and 48b is lined with a composite ink absorber 50 to more securely trap and retain ink liquids and inky sludge. Also, the use of cavity absorbers 50 may negate the need for absorber 10 overlapping the edges of cavities 46a, 46b, 48a, and 48b, thus increasing the effective capture area for each cavity. Although it is expected that cavity absorbers 50 will use the same composition as absorber 10, other compositions may be used. For example, the required sludge holding capacity of cavity absorbers 50 may not be as great as that of absorber 10 and, thus, cavity absorbers 50 may use a thinner layer of open cell foam (porous layer 12 in FIG. 2). For another example, where the cavity itself is sufficient to adequately contain inky sludge, cavity absorbers 50 may be composed of only of a layer of ink liquid absorbing material, such as absorbent layer 14 in FIG. 2. As with absorber 10, cavity absorbers 50 may be permanent or replaceable.

As noted at the beginning of this Description, the embodiments shown in the figures and described above illustrate but do not limit the invention. Other embodiments are possible. Therefore, the foregoing description should not be construed to limit the scope of the invention, which is defined in the following claims.

What is claimed is:

1. A composite ink absorber, comprising a porous layer and an absorbent layer integrated together into a single part, the porous layer including a reticulated open cell foam and configured to trap inky sludge below a top surface of the open cell foam while simultaneously allowing ink liquids to pass through to the absorbent layer and the absorbent layer configured to absorb ink liquids passing through the porous layer.

2. The composite ink absorber of claim 1, wherein the porous and absorbent layers are integrated together along an open interface through which ink liquids may pass readily from the porous layer to the absorbent layer.

3. The composite ink absorber of claim 1, wherein:
the absorbent layer comprises a layer of needle felt.

4. The composite ink absorber of claim 3, wherein the single part comprises a laminate of the layers of open cell foam and needle felt.

5. The composite ink absorber of claim 4, wherein the layers of open cell foam and needle felt are laminated together with a hot-melt adhesive web or with a spray-on adhesive.

6. The composite ink absorber of claim 4, wherein the layer of open cell foam comprises a layer of open cell foam having 20-40 pores per inch.

7. The composite ink absorber of claim 6, wherein the layer of open cell foam comprises a 2-3 mm thick layer of open cell foam.

8. The composite ink absorber of claim 7, wherein the layer of needle felt comprises a 2-3 mm thick layer of medium density needle felt.

9. A printer platen assembly, comprising:
a platen having a floor and a plurality of supports protruding up from the floor, the supports configured to support a first size print substrate in a first support area; and
an ink absorber covering the floor of the platen under the first support area, the ink absorber including a porous layer and an absorbent layer integrated together into a single part, the porous layer including reticulated open cell foam and configured to trap inky sludge below a top surface of the open cell foam while simultaneously allowing ink liquids to pass through to the absorbent layer, and the absorbent layer configured to absorb ink liquids passing through the porous layer.

10. The platen assembly of claim 9 further comprising first and second cavities in the platen floor located opposite one another on either side of the first support area for capturing ink overspray along the first support area, the ink absorber covering the floor of the platen under the first support area and at least partially surrounding the first cavity and the second cavity.

11. The platen assembly of claim 10, wherein;
the platen supports are also configured to support a second size print substrate smaller than the first size in a second support area overlapping the first support area;
the platen assembly also comprises third and fourth cavities in the platen floor located opposite one another on either side of the second support area for capturing ink overspray along the second support area; and
the ink absorber completely surrounds the third cavity and the fourth cavity.

12. The platen assembly of claim 11, wherein the ink absorber overlaps the edge of each cavity along that portion of the ink absorber surrounding the cavity.

13. The platen assembly of claim 11, further comprising an ink absorber in each cavity.

14. The platen assembly of claim 13, wherein each cavity ink absorber includes a porous layer and an absorbent layer integrated together into a single part, the porous layer configured to trap inky sludge while simultaneously allowing ink liquids to pass through to the absorbent layer, and the absorbent layer configured to absorb ink liquids passing through the porous layer.

15. The platen assembly of claim 9, wherein the porous and absorbent layers are integrated together along an open interface through which ink liquids may pass readily from the porous layer to the absorbent layer.

16. The platen assembly of claim 15, wherein:
the absorbent layer comprises a layer of needle felt.

17. The platen assembly of claim 16, wherein the single part comprises a laminate of the layers of open cell foam and needle felt.

18. A printer platen assembly, comprising:
a platen having a floor and a plurality of supports protruding up from the floor, the supports configured to support a first size print substrate in a first support area;
an ink absorber covering the floor of the platen under the first support area, the ink absorber including a porous layer and an absorbent layer integrated together into a single part, the porous layer configured to trap inky sludge while simultaneously allowing ink liquids to pass through to the absorbent layer, and the absorbent layer configured to absorb ink liquids passing through the porous layer; and
first and second cavities in the platen floor located opposite one another on either side of the first support area for capturing ink overspray along the first support area, the ink absorber covering the floor of the platen under the first support area and at least partially surrounding the first cavity and the second cavity.

19. The printer platen assembly of claim 18, wherein the porous layer comprises a 2-3 mm thick layer of open cell foam having 20-40 pores per inch and the absorbent layer comprises a 2-3 mm thick layer of medium density needle felt.

* * * * *